Oct. 23, 1934. P. C. TIMM ET AL Re. 19,352

FURNACE HEAT REGULATOR

Original Filed June 15, 1932

Inventors

P. C. Timm
W. P. Timm

By Emil F. Lange

Attorney

Reissued Oct. 23, 1934

Re. 19,352

UNITED STATES PATENT OFFICE 19,352

FURNACE HEAT REGULATOR

Paul C. Timm and William P. Timm,
Lincoln, Nebr.

Original No. 1,897,408, dated February 14, 1933,
Serial No. 617,408, June 15, 1932. Application
for reissue July 2, 1934, Serial No. 733,526

18 Claims. (Cl. 236—16)

The present invention relates to furnace heat regulators, it being in the nature of an improvement on the furnace heat regulator which we show and describe in our prior patent, No. 1,897,408, granted February 14, 1933.

One of our objects is the provision of mechanism which will give an exceedingly sensitive control over the room temperatures.

Another of our objects is the provision of a lever control for regulating the room temperatures.

Another object which we have in view is the provision of a compound fulcrum for altering the rate of movement of the regulating lever, the fulcrum being adjustable to provide either a two-point bearing or a rolling fulcrum.

Another of our objects is the provision of a device to be manually operated for opening the draft valve of the furnace, the device being automatically disengaged when the room temperature reaches a predetermined limit.

Another of our objects is the provision of a light or other signal indicating to the occupants of the room whether or not the draft valve is open.

Having in view these objects and others which will be pointed out in the following description, we will now refer to the drawing, in which Figure 1 is a view largely in diagram and partly in side elevation and partly in section showing a part of the furnace and all of the operating mechanism for our furnace heat regulator.

Figure 1:
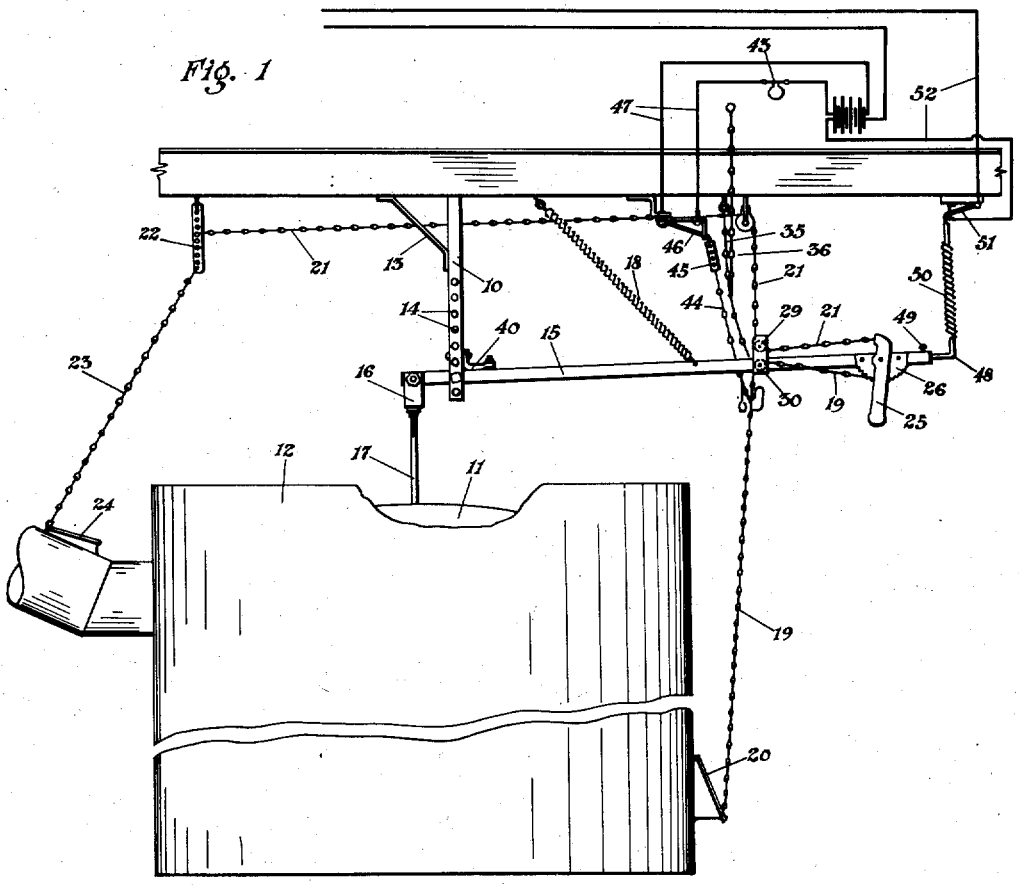

The support 10 is secured to a fixed part of the building to depend therefrom directly above the dome 11 of the furnace 12. The support 10 is preferably braced as shown at 13. The support is provided with a plurality of apertures 14 for adjustably supporting the regulating lever 15. The purpose of the plurality of apertures 14 is to make it possible to secure the lever 15 at the desired height above the dome 11 of the furnace. Furnace installations vary widely and there is great variation in the distance between the top of the furnace and the ceiling of the basement. The number of apertures 14 and their distances apart affords a structure which adapts itself readily to all furnace installations.

The short arm of the lever 15 is pivotally connected to a yoke 16 which supports a depending rod 17. The long arm of the lever is provided with a counter-balancing spring 18 which is connected to the basement ceiling, the action of the spring 18 being to hold the rod 17 pressed against the dome of the furnace. Secured to the long arm of the lever is a chain 19 or the like which is connected to the draft valve 20 of the furnace. Upward movement of the long arm of the lever 15 will thus be communicated through the chain 19 to open the draft valve 20 and downward movement of the long arm of the lever 15 will permit the closing of the draft valve 20. The chain 21 is also secured to the long arm of the lever 15 and it is secured at its opposite extremity to a lever 22 which is pivotally suspended from the ceiling. The lever 22 is connected by means of a chain 23 with the check valve 24. Downward movement of the regulating lever 15 will therefore open the check valve 24 while it is permitting the draft valve 20 to close. There is one important difference, however, in the movements of the two valves owing to the lever connection 22 between the chains 21 and 23. The long arm of the regulating lever necessarily amplifies the movements of expansion and contraction of the furnace dome 11. This amplified movement is transmitted to the draft valve 20 but the movement transmitted to the check valve 24 is still further amplified through the lever 22. It should also be noted that the lever 22 is provided with a plurality of apertures which permit adjustment between the chains 21 and 23 to increase or decrease the amplitude of the movement.

As thus far described, the features are found in our prior patent but a number of important refinements have been added to the structure as shown in the drawing of our present application. The lever 25 is pivotally secured to the lever 15 and it cooperates with an arcuate rack 26 having peripheral corrugations or other friction means for resisting the movements of the lever 25 about its pivot. The rack 26 is also provided with a scale (not shown) for the convenience of the operator of the furnace. The cables 19 and 21 are secured to the lever 15 through the lever 25. The connections of these two cables are on opposite sides of the pivotal point of the lever 25. Any adjusting movement of the lever 25 will therefore be communicated to the cables in opposite directions. The purpose of the lever 25 is to provide an exceedingly fine adjustment for the control of the furnace temperatures.

Figure 2:
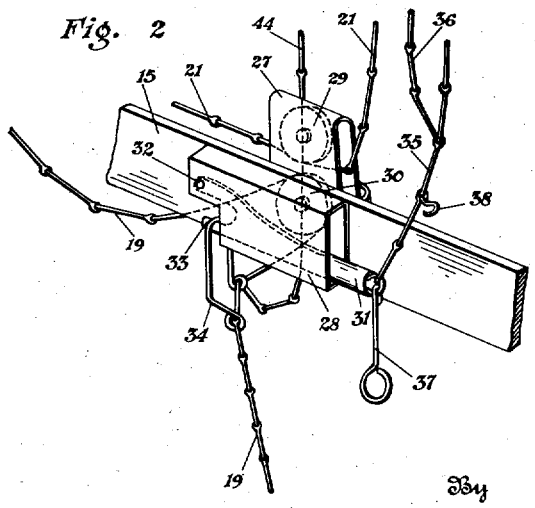
Figure 2 is a view in perspective of the tripping mechanism.

It sometimes becomes necessary to manually open the draft valve 20 in order to quickly raise the temperature of the furnace. We have therefore provided a mechanism as best shown in Figure 2, the mechanism being manually operable to open the draft valve but being automatically operable to restore the draft valve to its connections for automatic operation through the lever 15. We have provided a housing 27 on one side of the lever 15 and a second housing 28 on the other side of the lever. The housing 27 which is in the rear of the lever as shown in Figure 2 and which is in front as shown in Figure 1 has two pulleys 29 and 30 journaled therein. The pulley 29 carries the chain 21 while the pulley 30 guides the chain 19. The chain 19 passes over the pulley 30 and then downwardly to the draft valve 20 in the rear of the lever 15 as viewed in Figure 2. Pivotally secured within the housing 28 is a lever 31 having an irregular outline as shown in dotted lines in Figure 2 and having its pivotal axis at 32. This lever has an arm 33 which projects beyond a cut away portion of the housing 28 as shown in Figure 2 but which lies entirely within the housing 28 when the lever 31 is in its opposite position of pivotal movement. The chain 19 is provided with a free link 34 which may be hooked over the arm 33 of the lever 31 in the manner shown in Figure 2. Pivotal movement of the lever 31 will withdraw the arm 33 into the housing 28 and it will shear off the link 34. The chain 35 is secured to the free end of the lever 31 and to a fixed point in the basement ceiling at a position such that the chain will be substantially vertical. It is obvious that downward pivotal movement of the long arm of the lever 15 will result in a pivotal movement of the lever 31 due to the tension which will be exerted on the chain 35. Because of the eccentric pivotal connection of the lever 31, the movement of the lever 31 will be amplified to suddenly release the free link 34 from the arm 33. The movement of the lever 31 is initiated by the downward movement of the free end of the lever 15 which carries with it the pivotal point 32. The inner end or arm 33 of the lever 31 thus moves down with the lever 15, but the outer end of the lever 31 is held from moving, except relatively to the lever 15, by the chain 35. The amplification of movement of the arm 33 results from the fact that this movement is a compound of the movements of the levers 15 and 31. The purpose of this construction is to make it possible to open the draft valve 20 by causing the free link 34 to engage the arm and then to leave the furnace without paying any further attention to it.

As th furnace warms up and as the lever 15 assumes a predetermined position, the link 34 will be suddenly disengaged so that the draft valve 20 will be automatically closed. In the spring and autumn of the year, it is frequently desirable to close the draft before the automatic mechanism as above described will release the draft to be closed. For this purpose a chain 36 or other flexible element is secured to the chain 35 and it is lead upwardly through the ceiling and into the living room. As the furnace warms up, the chain 36 may be grasped to lift up on the chain 35 and to thus release the free link 34 from the arm 33, thus closing the draft. The upward movement of the long arm of the lever will release the tension on the chain 35 so that the lever 31 is permitted to fall back into the position shown in Figure 2. Should the lever 31 not fall back, it is an easy matter to grasp the hanger 37 to restore the lever 31 to its position where the free link may be again hooked on the arm 33 when desired. The chain 35 may be adjusted in length in any desired manner in order to trip the lever 31 at the predetermined instant. This may be accomplished by providing a hook link 38 which may be caused to engage any one of a number of the upper links to adjustably shorten the chain 35.

The means for holding the draft valve 20 in open position and for automatically closing the draft valve at a predetermined furnace temperature may be used independently of the mechanism for gradually opening or closing the draft valve 20 or it may even be installed alone. After refueling the furnace, it is often desirable that the draft valve 20 be left in open position until the fire gets started to the point of the normal temperature of the living rooms. To leave the draft valve open by means of the devices at present in use is rather dangerous since it is an easy matter to forget that the draft valve is open with the consequence that the furnace and room temperatures may become so great as to constitute a serious fire hazard. By employing a device such as the link 34 on the arm 33 of the lever 31 and by making this responsive to the furnace temperatures as through the lever 15, the draft valve 20 will be automatically closed at the predetermined furnace temperature regardless of whether or not it receives any further attention. The predetermined point at which the draft valve is tripped to closing position is adjustable through the lever 25. In milder weather the mechanism should be automatically tripped at a much lower furnace temperature than when the weather is cold or severe. The point, however, is that this mechanism may be installed on a furnace either with or without the installation of the mechanism for gradually opening and closing the draft valve 20 and the check valve 24.

Figure 3:
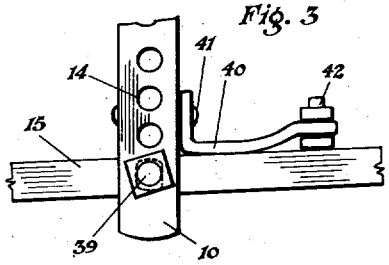
Figure 3 is an elevational view of fragments of the support and regulating lever, showing particularly the fulcrum arrangement.

The lever 15 has a compound fulcrum at its pivotal point as best shown in Figure 3. The support 10 is provided with a plurality of apertures 14 adapted to receive a pivot pin 39. The lever 15 is provided with one aperture which is elongated vertically into the form of a slot as shown in dotted lines in Figure 3. Secured to the side of the support 10 is an arcuate bearing member 40, this being secured to the support by means of a bolt or the like 41. The position of this bearing member must be determined by the aperture which is employed for receiving the pivot pin 39. The construction, however, affords an easy means for adjustment since the bolt 41 may be easily secured to the support 10 at any desired point. At the extremity of the arcuate member 40 is an adjustable abutment 42 which may be adjusted in length. When in the position shown in Figure 3, the fulcrum will move gradually along the under surface of the arcuate member 40 and it will thus change its rate of movement at every point in the lower arcuate surface, the movement of the lever 15 being thus not merely amplified but also accelerated. If only a two-point bearing is desired, the abutment 42 may be so adjusted as to render inoperative the lower surface of the arcuate member 40 thus providing two successive pivotal axes 39 and 42 which may be in any desired ratio to each other.

A signal such as a bulb 43 is provided for indicating when the draft valve 20 is open. The mechanism for energizing the bulb 43 includes a chain 44 which is connected to the chain 19 as shown in Figure 2. The chain 44 is connected through an adjusting device 45 with a switch member 46. The switch member 46 is made of resilient material to contact with its cooperating switch member but it is held out of engagement therewith by the tension on the cable 44 when the draft valve 20 is closed. The opening movement of the draft valve 20 equal in distance to the distance between the switch members will cause the switch member 46 to close the light circuit 47. As the draft valve 20 closes, the switch member 46 will move out of contact owing to its resilience. By means of the adjustable plate 45 the length of the cable 44 may be adjusted as desired.

An L-shaped lever 48 is secured to the lever 15 to project beyond the extremity thereof. The lever 48 is angularly adjustable on the lever 15 by means of a set screw 49 or the like. A coil spring 50 is connected to the lever 48 and to a resilient switch element 51 as shown in Figure 1. The closing of the switch 51 will close the circuit 52 to start the operation of a fan (not shown), as shown and described in our prior patent.

In our description we have used terms which describe precisely the various parts shown in our drawing. It is to be understood, however, that we reserve to ourselves the full range of mechanical equivalents falling under the terms which appear in the appended claims. For example, the term "chain" applies to the elements as shown in our drawing but it is obvious that other forms of chains could be employed or other flexible elements which would perform all of the functions of the chains which we show. Likewise, the term "draft valve" refers in general to the element which permits the entrance of air to the combustible fuel to increase the heat in the furnace, regardless of whether the fuel is solid like coal, liquid like fuel oil or gaseous. When the heat is generated by other than a combustible fuel, some form of regulator becomes necessary and it is possible to employ the chain 19 for controlling such a regulator. An example of this would be the electric stove in which the heat is regulated by a rheostat. Our furnace attachment is, however, fully adapted for connection with such heaters without in any way altering the structure of the attachment except to adjust the various parts for the specific form of heater.

Having thus described our invention in such full, clear, and exact terms that its construction and operation will be readily understood by others skilled in the art to which it pertains, what we claim as new and desire to secure by Letters Patent of the United States is:

1. A furnace attachment including a lever for transmitting in amplified form the movements of expansion and contraction of the furnace to automatically control the opening and closing movements of the draft valve of the furnace, and a stationary fulcrum having an elongated curved bearing surface for progressively altering the amplitude of movement of said lever.

2. A furnace attachment including a lever for transmitting in amplified form the movements of expansion and contraction of the furnace to automatically control the opening and closing movements of the draft valve of the furnace, a curved fulcrum contact for progressively altering the amplitude of movement of said lever, and an adjustable abutment at the outer extremity of said fulcrum.

3. A furnace attachment including a lever for transmitting in amplified form the movements of expansion and contraction of the furnace to automatically control the opening and closing movements of the draft valve and check valve of the furnace, a manually operable lever adjustably secured to the first said lever, and chains secured respectively to the check valve and the draft valve of the furnace and to said manually operable lever whereby adjustment thereof will adjustably alter the initial setting of both of said chains.

4. A furnace attachment including a lever and a chain for transmitting the movements of expansion and contraction of the furnace to automatically control the opening and closing movements of the draft valve of the furnace, means for shortening said chain to hold the draft valve of the furnace in open position, and means for automatically releasing said chain shortening means when the temperature of the furnace reaches a predetermined point.

5. A furnace attachment including a lever and a chain for transmitting the movements of expansion and contraction of the furnace to automatically control the opening and closing movements of the draft valve of the furnace, means for shortening said chain to hold the draft valve of the furnace in open position, means for automatically releasing said chain shortening means when the temperature of the furnace reaches a predetermined point, and a remote control for manually actuating said releasing means.

6. A furnace attachment including a lever and a chain for transmitting the movements of expansion and contraction of the furnace to automatically control the opening and closing movements of the draft valve of the furnace, a second lever pivotally secured to the first said lever, means on said second lever for engaging said chain to shorten said chain and to thereby maintain the draft valve of the furnace in open position, and automatically operated means for releasing said means on said second lever from engagement with said chain when the temperature of the furnace reaches a predetermined point.

7. A furnace heat regulator comprising a heat responsive member connected to the draft valve for operation, means for holding the furnace draft valve in open position while simultaneously maintaining said valve against complete closing by said member, and means for automatically releasing said holding means at a predetermined furnace temperature, said releasing means being adjustable for automatic operation at any desired furnace temperature.

8. A furnace heat regulator comprising a heat responsive member connected to the draft valve for operation, means for opening the furnace draft valve, means carried by the member for holding the furnace draft valve in open position while simultaneously maintaining said valve against complete closing by said member, and means for automatically releasing said holding means at a predetermined furnace temperature, said releasing means being adjustable for automatic operation at any desired furnace temperature.

9. A furnace attachment including a lever connected to the furnace draft valve and operable by the movements of expansion and contraction of the furnace, means carried by the lever for releasably holding the draft valve of the furnace against complete closing, and means operable by said lever at a predetermined furnace temperature for automatically releasing said valve from said holding means for lever operation.

10. A furnace attachment including a lever connected to the draft valve and operable by the movements of expansion and contraction of the furnace, manually operable means for opening the draft valve of the furnace while simultaneously preventing complete closing of the valve by said lever, means for releasably holding said manually operable means to maintain the draft valve of the furnace in open position irrespective of the position of the lever, and means operable by said lever for automatically releasing said holding means at a predetermined furnace temperature whereby to restore the valve to the lever for operation thereby.

11. A furnace attachment including a lever having one of its ends in contact with the furnace for lever movements in response to the movements of expansion and contraction of the furnace, means operable by said lever for opening and closing the draft valve and the check valve of the furnace in response to the movements of expansion and contraction of the furnace, a control for manually opening the draft valve of the furnace, and means automatically operable to close the draft valve of the furnace at a predetermined furnace temperature.

12. A furnace attachment including a lever having a pivot outside the furnace jacket and in proximity thereto, the inner extremity of said lever being in contact with the furnace for lever movements in response to the movements of expansion and contraction of the furnace, means operable by said lever for opening and closing the draft valve and the check valve of the furnace in response to the expansion and contraction movements of the furnace, means for opening the draft valve of the furnace, means for holding the draft valve of the furnace in open position, and means automatically operable to close the draft valve of the furnace at a predetermined furnace temperature.

13. A furnace heat regulator comprising a heat responsive member connected to the draft valve for operation, means for disengaging said member from valve operation and holding the furnace draft valve in open position, said means automatically releasing the draft valve for operation into open or closed position by said member at a predetermined furnace temperature.

14. A furnace heat regulator comprising a heat responsive member connected to the draft valve of the furnace for operation, and releasable means for disengaging said member from valve operation and holding the draft valve in open position against complete closing by the member until a predetermined furnace temperature has been reached.

15. A furnace heat regulator comprising a heat responsive member connected to the draft valve of the furnace for operation, and releasable means carried by said member for disengaging said member from valve operation and holding the draft valve in open position against complete closing by the member until a predetermined furnace temperature has been reached.

16. A furnace heat regulator comprising a heat responsive member connected to the draft valve of the furnace for operation, and manually set releasable means carried by said member for disengaging said member from valve operation and holding the draft valve in open position against complete closing by the member until a predetermined furnace temperature has been reached.

17. A furnace heat regulator comprising a flexible member connected at one end to the draft valve of the furnace, a member movable under temperature changes in the furnace, releasable holding means carried by the second member engageable with said flexible member for holding the draft valve open irrespective of the temperature in the furnace, and means connected to said holding means and to a stationary part for releasing said holding means when a predetermined temperature has been reached in the furnace.

18. A furnace heat regulator comprising a member connected to the draft valve of the furnace, a second member connected to the furnace and movable under temperature changes in the furnace, a rock member carried by said second member and movable therewith, means carried by said rock member and engaging said first member for releasably holding the draft valve in open position irrespective of temperature changes in the furnace, and a third member secured at one part to a stationary support and connected at another part to said rock member whereby to rock said rock member into released position for closing the draft valve at a predetermined furnace temperature.

PAUL C. TIMM.
WILLIAM P. TIMM.